US008867570B2

United States Patent
Mudulodu et al.

(10) Patent No.: US 8,867,570 B2
(45) Date of Patent: Oct. 21, 2014

(54) METHODS OF TRANSMITTING PILOT TONES AND DATA IN SPATIAL MULTIPLEXING TRANSMISSION

(75) Inventors: Sriram Mudulodu, Santa Clara, CA (US); Rajesh Raja Manakkal, Santa Clara, CA (US); Sam P. Alex, Santa Clara, CA (US); Louay Jalloul, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1551 days.

(21) Appl. No.: 11/823,692

(22) Filed: Jun. 28, 2007

(65) Prior Publication Data

US 2008/0273510 A1 Nov. 6, 2008

Related U.S. Application Data

(60) Provisional application No. 60/926,982, filed on May 1, 2007.

(51) Int. Cl.
| | |
|---|---|
| *H04B 3/10* | (2006.01) |
| *H04B 7/04* | (2006.01) |
| *H04L 5/00* | (2006.01) |
| *H04B 7/06* | (2006.01) |
| *H04W 52/32* | (2009.01) |
| *H04L 27/26* | (2006.01) |

(52) U.S. Cl.
CPC ............ *H04B 7/0452* (2013.01); *H04L 5/0037* (2013.01); *H04L 5/0051* (2013.01); *H04W 52/325* (2013.01); *H04L 5/0042* (2013.01); *H04L 5/005* (2013.01); *H04L 27/2657* (2013.01); *H04L 5/0023* (2013.01); *H04B 7/068* (2013.01)

USPC ............ 370/491; 370/500; 370/208; 370/330

(58) Field of Classification Search
CPC ...................................................... H04L 5/0048
USPC ................... 370/208, 330, 339, 478, 491, 500
See application file for complete search history.

(56) References Cited

U.S. PATENT DOCUMENTS

| | | | | |
|---|---|---|---|---|
| 8,098,567 | B2* | 1/2012 | Brehler et al. ................ | 370/203 |
| 2004/0100897 | A1 | 5/2004 | Shattil | |
| 2005/0220207 | A1 | 10/2005 | Perlman et al. | |
| 2006/0164971 | A1* | 7/2006 | Moorti et al. ................ | 370/208 |
| 2006/0182063 | A1* | 8/2006 | Ma et al. ...................... | 370/331 |
| 2006/0198449 | A1* | 9/2006 | De Bart et al. ............... | 375/260 |
| 2006/0285479 | A1 | 12/2006 | Han et al. | |
| 2007/0058740 | A1* | 3/2007 | Akahori ........................ | 375/260 |
| 2007/0087749 | A1* | 4/2007 | Ionescu et al. ................ | 455/436 |
| 2007/0115800 | A1* | 5/2007 | Fonseka et al. ............... | 370/208 |

OTHER PUBLICATIONS

International Search Report for International Patent Application No. PCT/US08/62305, ISA/US, Commissioner Patents, United States, mailed on Jul. 17, 1 page.

* cited by examiner

*Primary Examiner* — Nicholas Sloms
(74) *Attorney, Agent, or Firm* — Sterne, Kessler, Goldstein & Fox P.L.L.C.

(57) ABSTRACT

A method and apparatus of transmitting pilot tones and data in multi-carrier spatial multiplexing transmission is disclosed. The method includes a plurality of subscribers transmitting data to a base station through common frequency sub-carrier and symbol time tiles. Each of the multiple subscribers rotating frequency sub-carrier and symbol time locations of pilot tones within the frequency sub-carrier and symbol time tiles.

19 Claims, 7 Drawing Sheets

X - Pilot Tone for First User
+ - Pilot Tone for Second User
D - Data

Tile 330:

| | $n_1$ | | $n_1+2$ |
|---|---|---|---|
| $k_1$ | X 310 | D | + 322 |
| | D | D | D |
| | D | D | D |
| $k_1+3$ | + 320 | D | X 312 |

Symbols (n)

Sub-carriers (k)

Data

Different Tile

Tile 340:

| | $n_2$ | | $n_2+2$ |
|---|---|---|---|
| $k_2$ | + 324 | D | X 314 |
| | D | D | D |
| | D | D | D |
| $k_2+3$ | X 316 | D | + 326 |

Symbols (n)

Data

FIGURE 3

| | | |
|---|---|---|
| $k_1$ $h_{avg}\exp\{j(-\varphi_1-3\varphi_2/2)\}$ | $h_{avg}\exp\{j(-3\varphi_2/2)\}$ | $h_{avg}\exp\{j(\varphi_1-3\varphi_2/2)\}$ |
| $h_{avg}\exp\{j(-\varphi_1-\varphi_2/2)\}$ | $h_{avg}\exp\{j(-\varphi_2/2)\}$ | $h_{avg}\exp\{j(\varphi_1-\varphi_2/2)\}$ |
| $h_{avg}\exp\{j(-\varphi_1+\varphi_2/2)\}$ | $h_{avg}\exp\{j(\varphi_2/2)\}$ | $h_{avg}\exp\{j(\varphi_1+\varphi_2/2)\}$ |
| $k_1+3$ $h_{avg}\exp\{j(-\varphi_1+3\varphi_2/2)\}$ | $h_{avg}\exp\{j(3\varphi_2/2)\}$ | $h_{avg}\exp\{j(\varphi_1+3\varphi_2/2)\}$ |

METHODS OF TRANSMITTING PILOT TONES AND DATA IN SPATIAL MULTIPLEXING TRANSMISSION

CROSS-REFERENCE TO RELATED APPLICATION

This application claims the benefit of U.S. Provisional Application Patent Application No. 60/926,982, filed on May 1, 2007, which is incorporated by reference in its entirety herein.

FIELD OF THE DESCRIBED EMBODIMENTS

The described embodiments relate generally to wireless communications. More particularly, the described embodiments relate to methods and systems for transmitting pilot tones and data within spatial multiplexed transmissions.

BACKGROUND

Spatial multiplexing is a transmission scheme that can exploit multiple antennas at both a base transceiver station and at subscriber units to increase the bit rate in a wireless radio link with no additional power or bandwidth consumption. Under certain conditions, spatial multiplexing offers a linear increase in spectrum efficiency with the number of antennas. For example, if three antennas are used at the transmitter and the receiver, the stream of possibly coded information symbols is split into three independent sub-streams. These sub-streams occupy the same channel of a multiple access protocol. Possible same channel multiple access protocols include a same time slot in a time-division multiple access protocol, a same frequency slot in frequency-division multiple access protocol, a same code sequence in code-division multiple access protocol or a same spatial target location in space-division multiple access protocol. The sub-streams are applied separately to the transmit antennas and transmitted through a radio channel. Due to the presence of various scattering objects in the environment, each signal experiences different multi-path propagation.

The composite signals resulting from the transmission are finally captured by multiple receiving antennas with random phase and amplitudes. At the multiple antenna receiver, a spatial signature of each of the received signals is estimated. Based on the spatial signatures (spatial signature and channel estimate are synonymous), a signal processing technique can be applied to separate the signals, recovering the original data sub-streams.

A type of spatial multiplexing is collaborative spatial multiplexing (CSM). CSM include multiple subscribers sharing a transmission channel for uplink transmission to a multiple antenna base station. The base station can characterize the transmission channels between the subscribers and the base station through the use of pilot tones within the transmission signals from the subscribers. In a mobile environment, the channel estimates can become inaccurate as subscribers move. The inaccuracies are primarily due to errors in the estimate of timing and frequency offset between the transmitter and the receiver. These offset may be created due to motion (Doppler), temperature, propagation delay, aging and other factors (such as, clocks of the transmitters and receivers).

It is desirable to improve estimates of transmission channels between base stations and mobile subscribers. Additionally, it is desirable to reduce the effects of frequency offset errors.

SUMMARY

An embodiment includes a method of transmitting pilot tones and data multi-carrier spatial multiplexing transmission. The method includes a plurality of subscribers transmitting data to a base station through common frequency sub-carrier and symbol time tiles. During transmission, each of the multiple subscribers alternates frequency sub-carrier and symbol time locations of pilot tones within the frequency sub-carrier and symbol time tiles.

Another embodiment includes a method of a multiple antenna base station performing collaborative spatial multiplexing. The method includes the multiple antenna base station receiving at least two frequency sub-carrier and symbol time tiles having rotated pilot tone locations, from a first subscriber. The multiple antenna base station computing conjugate products of received pilot symbols of the at least two frequency sub-carrier and symbol time tiles after removing transmitted pilot symbols. The multiple antenna base station averages the conjugate products obtained from the at least two frequency sub-carrier and symbol time tiles. The multiple antenna base station determines a first phase offset and a second phase offset for the first subscriber, based on the averaged conjugate products. Similar phase offsets can be determined for a second user as well.

Another embodiment includes a method of a subscriber transmitting pilot tones and data in multi-carrier spatial multiplexing transmission. The method includes the subscriber transmitting data to a multiple antenna base station through frequency sub-carrier and symbol time tiles. The subscriber alternates frequency sub-carrier and symbol time locations of pilot tones within the frequency sub-carrier and symbol time tiles.

Other aspects and advantages of the described embodiments will become apparent from the following detailed description, taken in conjunction with the accompanying drawings, illustrating by way of example, the principles of the described embodiments.

BRIEF DESCRIPTION OF THE DRAWINGS

FIG. 3 shows an example of data tones and pilot tones of subscribers of a collaborative spatial multiplexing system in which the pilot tones of a subscriber rotate from one tile to another.

FIG. 4 is a table that shows an example of how phase estimates are used to update or improve channel estimates.

DETAILED DESCRIPTION

Methods and apparatuses for estimating phase offsets (due to frequency and vertical phase offsets due to timing offset or channel selectivity) of mobile subscriber units are disclosed. The estimate phase offsets can be used for improving estimates of transmission channel between mobile subscribers and base stations. The channel estimates can be used to support collaborative spatial multiplexing. Estimates of phase offsets (errors) due to frequency offsets can also be used for reducing inter-carrier interference (ICI).

Figure 1:
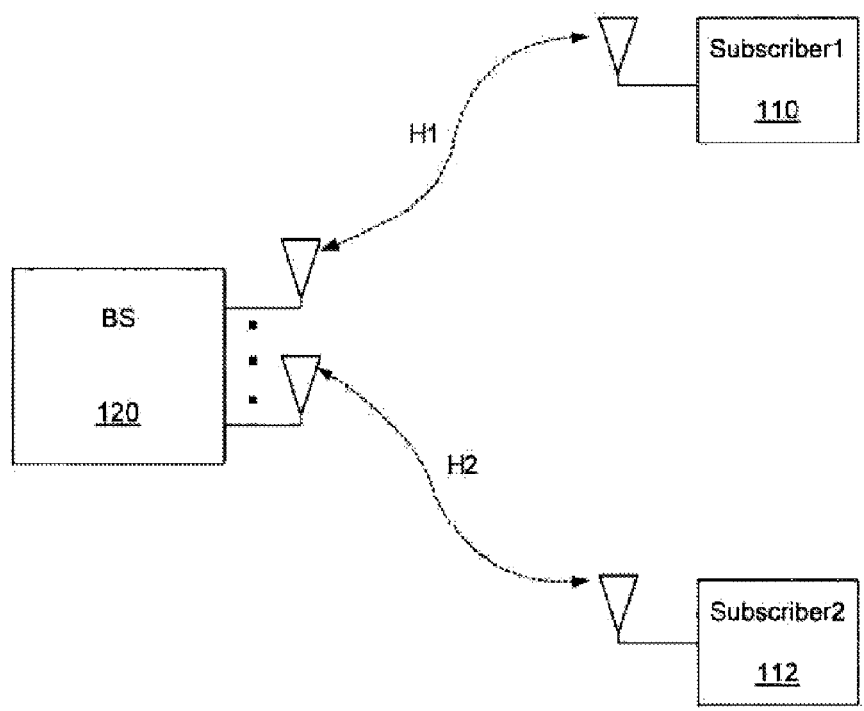
FIG. 1 shows an example of a collaborative spatial multiplexing system.

FIG. 1 shows an example of a collaborative spatial multiplexing (CSM) system. The collaborative spatial multiplexing system includes a plurality of subscribers 110, 112 transmitting data tones over common transmission channels to a single multiple-antenna base station 120. Based on spatial signatures of the channels between the base station 120 and each of the subscribers 110, 112, the base station 120 can decode the data from each of the subscribers 110, 112. The system of FIG. 1 only includes a single base station 120 and two subscribers 110, 112. However, it is to be understood that wireless systems can include many base stations and many subscribers. More than two subscribers can be included in collaborative spatial multiplexing with a signal multiple-antenna base station. However, for WiMAX, only two subscribers share a tile, wherein tile is a collection of frequency sub-carriers and OFDM time symbols. For WiMAX, a tile includes four frequency sub-carriers and three OFDM time symbols. The multiple-antenna base station can estimate a transmission channel between each antenna of the multiple-antenna base station and each of the subscribers 110, 112 based on pilot tones (as will be described) within transmission signals of the subscribers 110, 112.

An OFDM (orthogonal frequency division multiplexing) system can include data tones, and pilot tones. The transmitter (subscriber for CSM systems) transmits known (known to the receiver, or base station in a CSM system) pilot symbol tones. The receiver uses this information to perform channel estimation. Additionally, timing and frequency offsets and Doppler shift can be compensated to improve the channel estimation. Once the channel estimates have been determined, the subscribers 110, 120 can transmit overlapping data tones that the base station 120 can de-multiplex based on the channel estimates.

Figure 2:
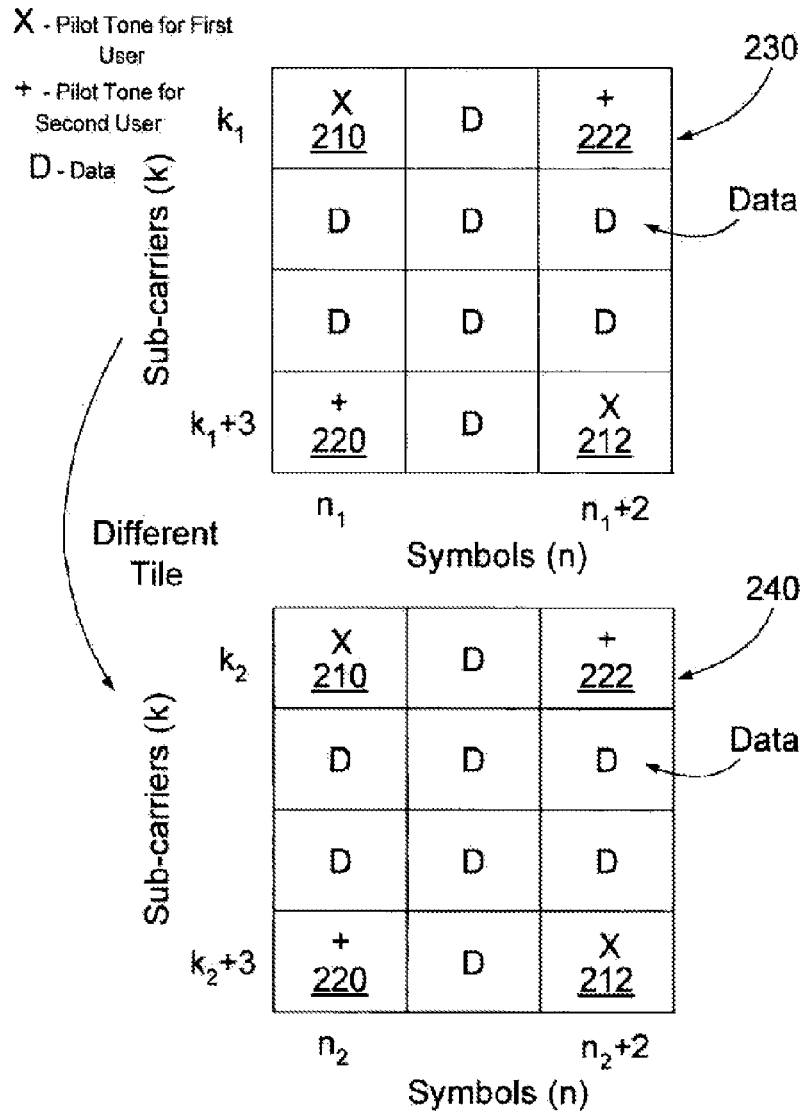
FIG. 2 shows an example of data tones and pilot tones of subscribers of a collaborative spatial multiplexing system.

FIG. 2 shows an example of a frequency sub-carrier, OFDM symbol tiles 230, 240 that includes data tones (D) and pilot tones 210, 212, 220, 222 of subscribers of a collaborative spatial multiplexing system. The pilot tones 210, 212 of a first subscriber are located at a different location within the frequency sub-carrier, OFDM symbol tiles 230, 240 than the pilot tones 220, 222 of a second subscriber. The two tiles 230, 240 can occur at different/random locations in the frequency spectrum. However, the pilot tones locations 210, 212, 220, 222 do not change from tile to tile. In a collaborative spatial multiplexing UL PUSC tile structure, according to IEEE 802.16e standard, data sub-carriers (D) of each of the two subscribers are superimposed and pilot sub-carriers 210, 212, 220, 222 of each of the two subscribers are placed on opposing corners of the tile. The locations of the data tones (D) and the pilot 210, 212, 220, 222 are set by an uplink map schedule, which is typically sent to the subscribers by the base station. The sub-carriers are labeled $k_1$ through $k_1+3$ and the symbols are labeled $n_1$ through $n_1+2$ for the first tile 230, and the sub-carriers are labeled $k_2$ through $k_2+3$ and the symbols are labeled $n_2$ through $n_2+2$ for the second tile 240. The pilot tones 210, 212, 220, 222 are typically transmitted at a slightly higher power level than the data tones. That is, the pilot tones 210, 212, 220, 222 are boosted with respect to the power level of the data tones.

While transmitting a signal from each subscriber to the base station a time offset can occur between each subscriber and the base station. For example, in accordance with IEEE 802.16e, for a 10 MHz channel the predefined reception rate is +/−8 samples. Similarly, a frequency offset may occur between each subscriber and the base station due to a Doppler and a local oscillator mismatch between a clock of each subscriber and a clock of the base station.

Timing offset and/or channel frequency selectivity can create a vertical phase offset. Vertical phase offset and frequency offset may cause degradation in link performance of the transmission channels between the subscribers and the base station. Further, vertical phase offset and frequency offset induce a loss in Signal-to-Noise-Ratio (SNR) of the channel and can lead to inter-carrier interference.

Mathematically, a receive signal at the multiple antenna base station 120 can be represented by:

$$y(k,n)=h_1(k,n)s_1(k,n)+h_2(k,n)s_2(k,n)+v(k,n) \quad (1)$$

wherein $y(k,n)$ is a received symbol on the k-th tone of the n-th OFDM symbol and this is a data tone. For pilot tones the two subscribers do not overlap. Hence the representation for the received symbol on pilot tones where subscriber index by j (j=1 or 2) transmits is as follows.

$$y(k,n)=h_j(k,n)s_j(k,n)+v(k,n) \quad (2)$$

Sometimes the pilot tones are boosted in power over the data tones. For example in WiMax like systems the boosting is 3 dB in power or $\sqrt{2}$ in amplitude. Hence the equation for the received symbol for the pilot tones of subscriber j is as follows.

$$y(k,n)=\sqrt{2}h_j(k,n)s_j(k,n)+v(k,n) \quad (3)$$

The transmit symbol of the first subscriber is represented by $s_1(k,n)$, and the transmit symbol of the second subscriber is represented by $s_2(k,n)$. Channel gains associated with a tone k and a symbol n between first subscriber and the base station are represented by $h_1(k,n)$. Similarly, channel gains associated with a tone k and a symbol n between second subscriber and the base station are represented by $h_2(k,n)$.

For the following discussion, $\phi_1$ represents the phase offset across one OFDM symbol due to frequency offset and/or Doppler, and $\phi_2$ is the average phase offset across one tone due to vertical phase offset.

Frequency Offset Estimation

A method for obtaining the phase error introduced by a frequency offset includes calculating an estimate the phase difference between pilots that are separated in time (that is, across OFDM symbols). The phase error can be used to correct the receive frequency to match that of the transmit frequency.

For a single non-CSM user, the received signal can be depicted by:

$$y(k,n)=h_1(k,n)s_1(k,n)+v(k,n) \quad (4)$$

The phase error term due to frequency offset can be obtained by performing a conjugate product of received tones over transmitted tones, and determining a phase of;

$$z_f(k_0, n_0) = \left(\frac{y(k_0, n_0)}{s_1(k_0, n_0)}\right)^* \left(\frac{y(k_0, n_0 + 2)}{s_1(k_0, n_0 + 2)}\right) \quad (5)$$

where $k_0$ is the first tone and $n_0$ is the first symbol within the tile.

The received tones that are used are the pilot tones in which the transmit symbol is known. The phase offset term can be determined by using more than one pair of pilots. That is, a similar conjugate product for other pilot pairs can be summed, and the phase is determined from the resulting sum. In the single user case, there are two pilot tone pairs per tile.

It is important to note that for each of the two terms of the product, the pilot tone index is the same. More specifically, the first term includes the first tone of first symbol, and the second term includes the first tone of the third symbol. The result can be referred to as a horizontal product because of the common tone locations, and denoted by the subscript f.

The frequency offset calculation is based on a phase difference over time (that is, over OFDM symbols). The phase of the above term (or the sum of such terms) provides a phase estimate of $2\phi_1$, and therefore, the frequency offset.

Vertical Phase Offset Estimation

One common method to remove residual vertical phase ramp across sub-carriers within an OFDM symbol is to perform a product between pilots after removal of the transmit symbol on the pilots on a given OFDM symbol.

The phase offset term due to vertical phase offset can be obtained by performing a conjugate product of received tones over transmitted tones, and determining the phase of;

$$z_v(k_0, n_0) = \left(\frac{y(k_0, n_0)}{s_1(k_0, n_0)}\right)^* \left(\frac{y(k_0+3, n_0)}{s_1(k_0+2, n_0)}\right) \quad (6)$$

The result can be referred to as a vertical product because of the common symbol locations, and denoted by the subscript v. More than one set of pilot pairs can be used to obtain the phase offset term. That is, multiple pilot pairs can be used to determine the phase offset due to vertical phase offset. The conjugate product across the multiple pilot pairs can be summed or averaged. The phase of this sum or average provides an estimate of $3\phi_2$, and therefore, the vertical phase offset.

The frequency offset estimate can be used to improve channel estimation performance, and therefore, the overall link quality. Also correcting for frequency offset separately reduces ICI (inter-carrier interference) and therefore improves overall performance. Accounting for the vertical phase offset can improve the overall performance by providing a better channel estimation.

Estimating Phase Offset Based on Rotated Pilot Tones

FIG. 3 shows an example of data tones (D) and pilot tones 310, 312, 320, 322, 314, 316, 324, 326 of subscribers of a collaborative spatial multiplexing system in which the pilot tones of a subscriber rotate from one tile (such as 330) to another (such as 340). The first tile 330 includes pilot tone locations 310, 312 of the first subscriber, and pilot tone locations 320, 322 of the second subscriber. The second tile 340 includes rotated tone locations. That is, the second tile includes pilot tone locations 314, 316 of the first subscriber, and pilot tone locations 324, 326 of the second subscriber. Pilot tones 310, 312, 320, 322, 314, 316, 324, 326 may be boosted relative to the data tones.

Comparing FIG. 3 with FIG. 2 illustrates that the alternate tiles have pilot tones that alternate in vertical and horizontal positions. That is, the pilot pair alternate in diagonal locations. For the first tile 330, the sub-carriers are labeled $k_1$ through $k_1+3$ and the symbols are labeled $n_1$ through $n_1+2$, and for the second tile 340 the sub-carriers are labeled $k_2$ through $k_2+3$ and the symbols are labeled $n_2$ through $n_2+2$.

The phase term of the conjugate cross-product of the first tile 330 provides an estimate of $2\phi_1+3\phi_2$. That is, an estimate of the phase of:

$$z_d(k_1, n_1) = \left(\frac{y(k_1, n_1)}{s_1(k_1, n_1)}\right)^* \left(\frac{y(k_1+3, n_1+2)}{s_1(k_1+3, n_1+2)}\right) \quad (7)$$

The phase terms need to be separated in order to do proper phase compensation. To obtain $\phi_1$ and $\phi_2$ terms an additional conjugate products is performed between pilots of a different tile which has a rotated pilot arrangement as shown below. An estimate of $2\phi_1-3\phi_2$ can be determined by estimating the phase of:

$$w_d(k_2, n_2) = \left(\frac{y(k_1+3, n_1)}{s_1(k_2+3, n_2)}\right)^* \left(\frac{y(k_2, n_2+2)}{s_1(k_2, n_2+2)}\right) \quad (8)$$

The above-calculations may be performed across two vertical tiles. The vertical tiles include the same three time symbols but different sub-carrier locations. That is, the calculations are across a pair of vertical tiles. In this case, $n_1=n_2$. However, more than one pair of tiles can be available across time (that is, across the symbol index).

An embodiment includes the above two conjugate products being averaged (or summed) across multiple tiles across different frequency sub-carriers, different OFDM symbols, different antennas and/or different frames. For the discussion here, the averaged conjugate products are represented by $z_{d,avg}$ and $w_{d,avg}$.

In an embodiment, the phase of $z_{d,avg}$ is added to the phase of $w_{d,avg}$ to obtain an estimate of $4\phi_1$. The phase of $w_{d,avg}$ is subtracted from $z_{d,avg}$ to obtain an estimate of $6\phi_2$.

Another embodiment includes the phases being obtained from the following product pairs. That is, $4\phi_1$ can be determined from the phase of:

$$z_{d,avg}(k_1,n_1)w_{d,avg}(k_2,n_2) \quad (9)$$

and $6\phi_2$ can be determined from the phase of:

$$(w_{d,avg}(k_2,n_2))^* z_{d,avg}(k_1,n_1) \quad (10)$$

Another embodiment includes the quantities, $z_d$, $w_d$ being used in place of the averaged quantities in the above steps to obtain estimates of $\phi_1$ and $\phi_2$.

In another embodiment, the averaging can be performed on the following quantities instead of or in addition to on $w_d$ and $z_d$:

$$z_d(k_1,n_1)w_d(k_2,n_2) \quad (w_d(k_2,n_2))^* z_d(k_1,n_1) \quad (11)$$

The phases of the above terms are then obtained to get estimates of $4\phi_1$ and $6\phi_2$, respectively.

Channel estimates can be initially estimated between each of the subscribers and the base station. Subsequently, the estimated time and frequency offset estimates can be used to improve the channel estimates. As previously described, the estimates of the transmission channels are used to spatially de-multiplex the data streams transmitted over common transmission channels by multiple subscribers.

Once $\phi_1$ and $\phi_2$ have been estimated, the channel estimates can be improved based upon the $\phi_1$ and $\phi_2$ estimates. For example, channel averages can be estimated for two tiles of a pair of tiles as follows:

First obtain a $h_{avg}$ for the two tiles of the pair (depending on the pilot arrangement) as follows:

$$h_{avg}(k_1, n_1) = \frac{1}{2\sqrt{2}} \left[ \left( \frac{y(k_1, n_1)}{s_1(k_1, n_1)} \right) + \left( \frac{y(k_1+3, n_1+2)}{s_1(k_1+3, n_1+2)} \right) \right] \quad (12)$$

and $$h_{avg}(k_2, n_2) = \frac{1}{2\sqrt{2}} \left[ \left( \frac{y(k_2+3, n_2)}{s_1(k_2+3, n_2)} \right) + \left( \frac{y(k_2, n_2+2)}{s_1(k_2, n_2+2)} \right) \right] \quad (13)$$

The term $\sqrt{2}$ is needed in the equations (12) and (13) for a WiMAX-like system where the pilots for each of the two users are boosted (with respect to data tones) by 3 dB in power.

In another embodiment, $h_{avg}$ for the two tiles of the pair (depending on the pilot arrangement) is formed as follows:

$$h_{avg}(k_1, n_1) = \frac{1}{2\sqrt{2}} \left[ \begin{array}{c} \left( \frac{y(k_1, n_1)}{s_1(k_1, n_1)} \right) e^{j\frac{(2\varphi_1+3\varphi_2)}{2}} + \\ \left( \frac{y(k_1+3, n_1+2)}{s_1(k_1+3, n_1+2)} \right) e^{-j\frac{(2\varphi_1+3\varphi_2)}{2}} \end{array} \right] \quad (14)$$

and $$h_{avg}(k_2, n_2) = \frac{1}{2\sqrt{2}} \left[ \begin{array}{c} \left( \frac{y(k_2+3, n_2)}{s_1(k_2+3, n_2)} \right) e^{j\frac{(2\varphi_1-3\varphi_2)}{2}} + \\ \left( \frac{y(k_2, n_2+2)}{s_1(k_2, n_2+2)} \right) e^{-j\frac{(2\varphi_1-3\varphi_2)}{2}} \end{array} \right] \quad (15)$$

FIG. 4 is a table that shows an example of how phase estimates are used to update or improve channel estimates. For a CSM system, the channels are updated independently because the timing and frequency offsets for the two users are different. The table of FIG. 4 shows the updated estimates for the different sub-carriers $k_1$ through $k_1+2$ and for the different time symbols $n_1$ through $n_1+2$. It is to be understood that other methods can be used to estimate the channels once estimates of $\phi_1$ and $\phi_2$ are obtained.

Figure 5:
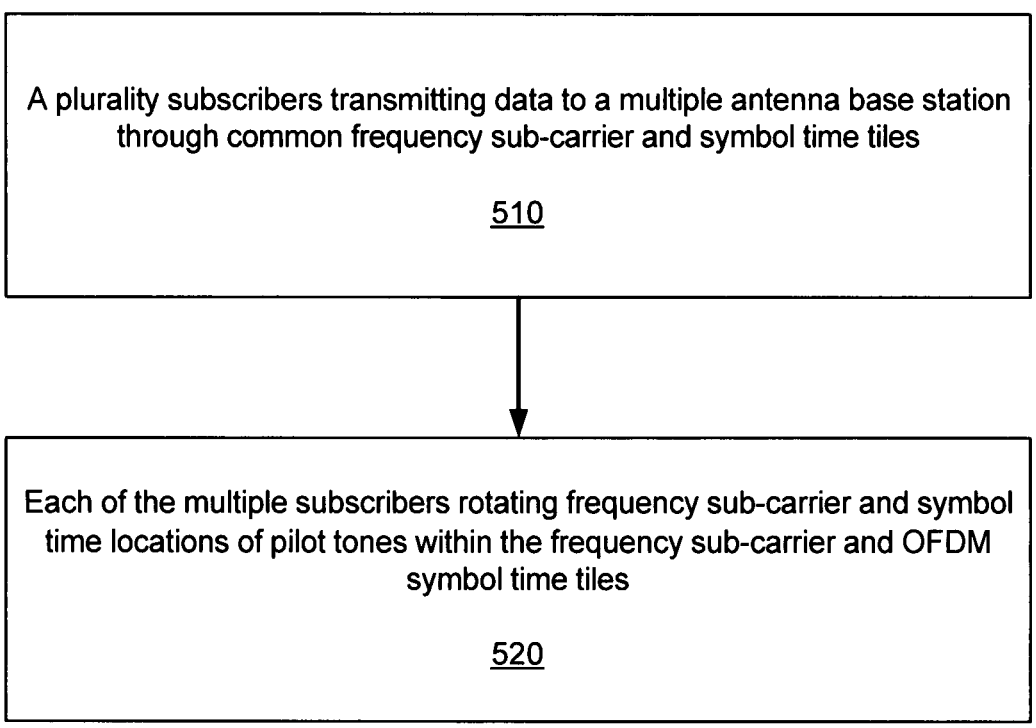
FIG. 5 is a flow chart that includes steps of one example of a method of transmitting pilot tones and data in OFDM spatial multiplexing transmission.

FIG. 5 is a flow chart that includes steps of one example of a method of transmitting pilot tones and data in OFDM spatial multiplexing transmission. A first step 510 includes a plurality of subscribers transmitting data to a multiple antenna base station through common frequency sub-carrier and symbol time tiles. A second step 520 includes each of the multiple subscribers rotating frequency sub-carrier and symbol time locations of pilot tones within the frequency sub-carrier and OFDM symbol time tiles.

The pilot tones of each of the plurality of subscribers do not overlap with pilot tones of the others of the plurality of subscribers. Embodiments include the rotating sub-carrier and symbol locations of the pilot tones being symmetrical with respect to frequency sub-carriers within the tiles, and/or the alternating sub-carrier and symbol locations of the pilot tones are symmetrical with respect to symbol times within the tiles. Generally, the locations of the pilot tones for the plurality of subscribers are defined by a schedule generated by the multiple antenna base station.

The multiple antenna base station receives the common frequency sub-carrier and common symbol time tiles from the plurality of subscribers, and estimates a total phase offset from the tiles received from each of the plurality of subscribers. For an embodiment, the base station estimates a total phase offset from the tiles received from a subscriber by receiving at least two frequency sub-carrier and symbol time tiles having rotated pilot tone locations, from the subscriber. The base station computes conjugate products of received pilot symbols after removal of the transmitted pilot symbols, of the at least two frequency sub-carrier and symbol time tiles. The base station averages the conjugate products obtained from the at least two frequency sub-carrier and symbol time tiles. The base station determines a first phase offset and a second phase offset for the subscriber, based on the averaged conjugate products.

As described collaborative spatial multiplexing includes more than one subscriber simultaneously transmitting to the multiple antenna base station. Accordingly, the multiple antenna base station receives at least two frequency sub-carrier and symbol time tiles having rotated pilot tone locations from a second subscriber, wherein the pilot tone locations of the second subscriber are different than the pilot tone locations of the first subscriber. The multiple antenna base station computes conjugate products of received pilot tones of the at least two frequency sub-carrier/symbol time tiles, after removal of the corresponding transmitted pilot symbols. The multiple antenna base station averages the conjugate products obtained from the at least two frequency sub-carrier/symbol time tiles. The multiple antenna base station determines a first phase offset and a second phase offset for the second subscriber. For an embodiment, the multiple antenna base station updates its channel estimation for first subscribers and the second subscriber based on the estimated first phase offsets and the second phase offsets.

Collaborative Spatial Multiplexing Using Estimated Phase Offsets

An embodiment of a collaborative spatial multiplexing system includes the multiple antenna base station estimating a first set of channels between each antenna of the multiple antenna base station and the first subscriber, and the multiple antenna base station estimating a second set of channels between each antenna of the multiple antenna base station and the second subscriber. The multiple antenna base station updates the first set of channel estimates based on the first and second phase offsets of the first subscriber, and the multiple antenna base station updates the second set of channel estimates based on the first and second phase offsets of the second subscriber.

Having updated the channel estimates of the first and second subscribers, the multiple antenna base station decodes data received from the first subscriber and data received from the second subscriber through common frequency sub-carrier and symbol time tiles, based on the updated first channel estimates and the updated second channel estimates. For an embodiment, a first weight is assigned to the first phase and a second weight is assigned to the second phase.

Figure 6:
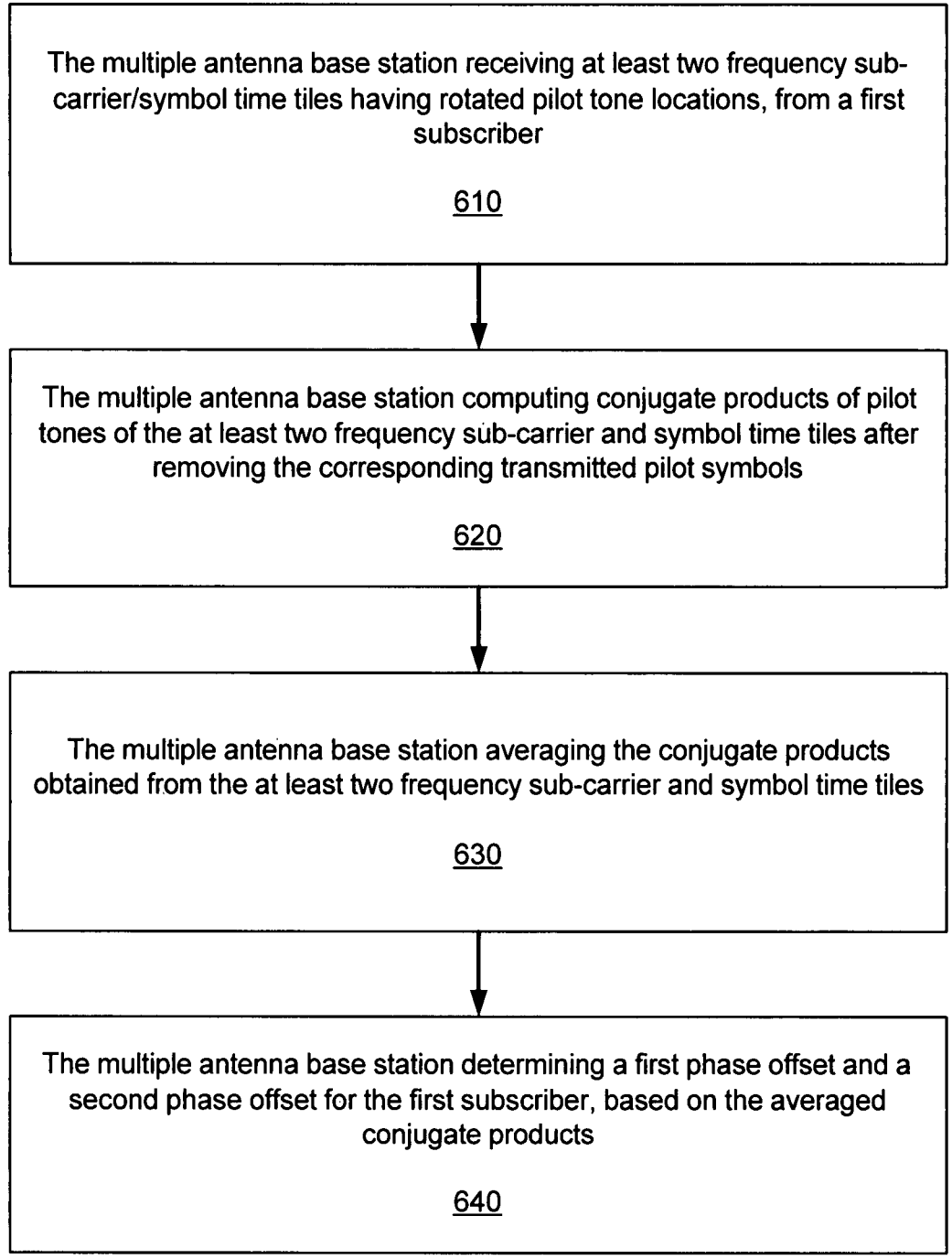
FIG. 6 is a flow chart that includes steps of one example of a method of a multiple antenna base station performing collaborative spatial multiplexing.

FIG. 6 is a flow chart that includes steps of one example of a method of a multiple antenna base station performing collaborative spatial multiplexing. A first step 610 includes the multiple antenna base station receiving at least two frequency sub-carrier/symbol time tiles having rotated pilot tone locations, from a first subscriber. A second step 620 includes the multiple antenna base station computing conjugate products of received pilot symbols of the at least two frequency sub-carrier and symbol time tiles after removing the corresponding transmitted pilot symbols. A third step 630 includes the multiple antenna-base station averaging the conjugate products obtained from the at least two frequency sub-carrier and symbol time tiles. A fourth step 640 includes the multiple antenna base station determining a first phase offset and a second phase offset for the first subscriber, based on the averaged conjugate products.

As described collaborative spatial multiplexing includes more than one subscriber simultaneously transmitting to the multiple antenna base station. Accordingly, the multiple antenna base station receives at least two frequency sub-carrier and symbol time tiles having rotated pilot tone locations from a second subscriber, wherein the pilot tone locations of the second subscriber are different than the pilot tone locations of the first subscriber. The multiple antenna base station computes conjugate products of received pilot symbols of the at least two frequency sub-carrier/symbol time tiles after removing the corresponding transmitted pilot symbols. The multiple antenna base station averages the conjugate products obtained from the at least two frequency sub-carrier/symbol time tiles. The multiple antenna base station determines a first phase offset and a second phase offset for the second subscriber.

Figure 7:
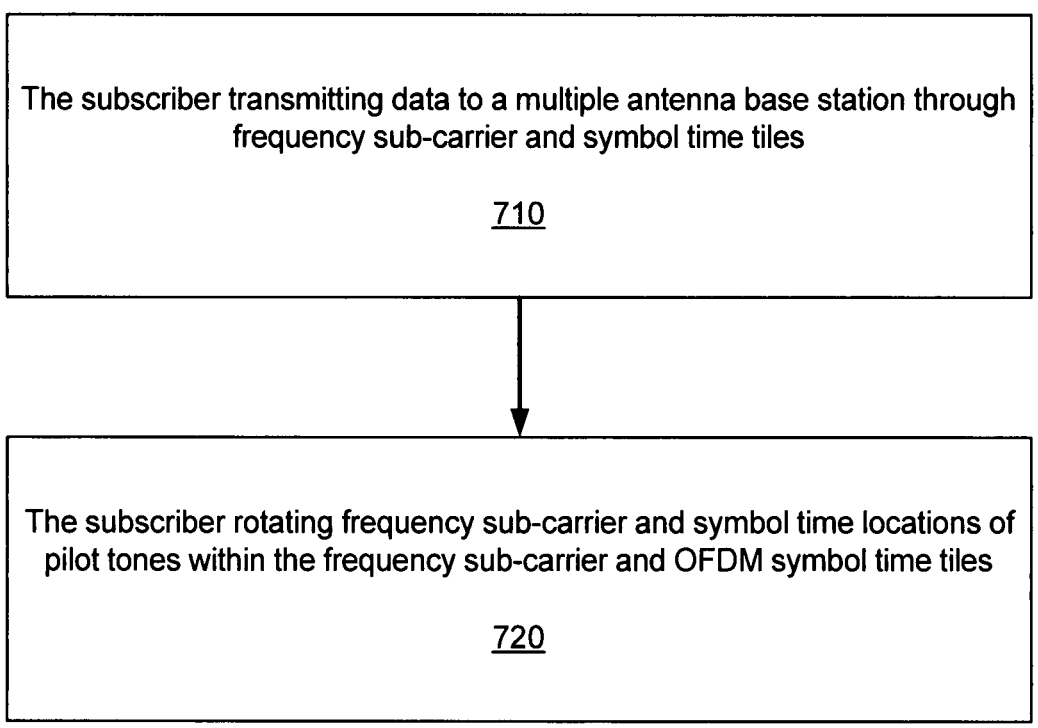
FIG. 7 is a flow chart that includes steps of one example of a method of a subscriber transmitting pilot tones and data in OFDM spatial multiplexing transmission.

FIG. 7 is a flow chart that includes steps of one example of a method of a subscriber transmitting pilot tones and data in OFDM spatial multiplexing transmission. A first step 710 includes the subscriber transmitting data to a multiple antenna base station through frequency sub-carrier and symbol time tiles. A second step 720 includes the subscriber rotating frequency sub-carrier and symbol time locations of pilot tones within the frequency sub-carrier and OFDM symbol time tiles.

As previously described, to allow a receiver to estimate phase offsets, the pilot tones of the subscriber do not overlap with pilot tones other subscribers that are supporting collaborative spatial multiplexing transmission to the multiple antenna base station. Embodiments include the rotated sub-carrier and symbol locations of the pilot tones being symmetrical with respect to frequency sub-carriers within the tiles, and/or the rotated sub-carrier and symbol locations of the pilot tones being symmetrical with respect to symbol times within the tiles.

Although specific embodiments of the invention have been described and illustrated, the invention is not to be limited to the specific forms or arrangements of parts so described and illustrated. The invention is limited only by the appended claims.

What is claimed:

1. A method comprising:
receiving, from a subscriber device, a first set of pilot symbols in a first frequency sub-carrier and symbol time tile and a second set of pilot symbols in a second frequency sub-carrier and symbol time tile, wherein the second set of pilot symbols are rotated relative to the first set of pilot symbols;
computing a first conjugate product of the first set of pilot symbols after removing from each pilot symbol in the first set of pilot symbols a known value of the pilot symbol as transmitted;
computing a second conjugate product of the second set of pilot symbols after removing from each pilot symbol in the second set of pilot symbols the known value of the pilot symbol as transmitted; and
combining the first conjugate product and the second conjugate product to obtain separate estimates for a phase offset across tones and a phase offset across orthogonal frequency-division, multiplexing (OFDM) symbols.

2. The method of claim 1, further comprising:
updating channel estimates for the subscriber device based on the estimated phase offset across tones and the estimated phase offset across OFDM symbols.

3. The method of claim 2, further comprising:
decoding data received from the subscriber device based on the updated channel estimates.

4. The method of claim 2, further comprising:
determining the updated channel estimates based on averaging the first set of pilot symbols after removing from each pilot symbol in the first set of pilot symbols the known value of the pilot symbol as transmitted.

5. The method of claim 1, wherein combining the first conjugate product and the second conjugate product comprises:
adding the first conjugate product to the second conjugate product; and
subtracting the second conjugate product from the first conjugate product.

6. The method of claim 1, wherein combining the first conjugate product and the second conjugate product comprises:
multiplying the first conjugate product by the second conjugate product; and
multiplying the second conjugate product by the first conjugate product.

7. The method of claim 1, further comprising:
before combining the first conjugate product and the second conjugate product, averaging the first conjugate product with one or more other conjugate products.

8. A method comprising:
receiving, a first set of pilot symbols in a first frequency sub-carrier and symbol time tile and a second set of pilot symbols in a second frequency sub-carrier and symbol time tile, wherein the second set of pilot symbols are rotated relative to the first set of pilot symbols;
computing a first conjugate product of the first set of pilot symbols and a second conjugate product of the second set of pilot symbols; and
combining the first conjugate product and the second conjugate product to obtain separate estimates for a phase offset across tones and a phase offset across orthogonal frequency-division multiplexing (OFDM) symbols.

9. The method of claim 8, further comprising:
updating channel estimates for a subscriber device based on the estimated phase offset across tones and the estimated phase offset across OFDM symbols.

10. The method of claim 9, further comprising:
decoding data received from the subscriber device based on the updated channel estimates.

11. The method of claim 9, further comprising:
determining the channel estimates based on averaging the first set of pilot symbols together after removing from each pilot symbol in the first set of pilot symbols a known value of the pilot symbol as transmitted.

12. The method of claim 8, wherein combining the first conjugate product and the second conjugate product comprises:
adding the first conjugate product to the second conjugate product; and
subtracting the second conjugate product from the first conjugate product.

13. The method of claim 8, wherein combining the first conjugate product and the second conjugate product comprises:
multiplying the first conjugate product by the second conjugate product; and
multiplying the second conjugate product by a conjugate of the first conjugate product.

14. The method of claim 8, further comprising:
before combining the first conjugate product and the second conjugate product, averaging the first conjugate product with one or more other conjugate products.

15. A method comprising:
receiving, from a subscriber device, a first set of pilot symbols in a first frequency sub-carrier and symbol time tile and a second set of pilot symbols in a second frequency sub-carrier and symbol time tile;

computing a first conjugate product of the first set of pilot symbols and a second conjugate product of the second set of pilot symbols; and combining the first conjugate product and the second conjugate product to obtain separate estimates for a phase offset across tones and a phase offset across orthogonal frequency-division multiplexing (OFDM) symbols, wherein additional sets of pilot symbols are received in the first and second frequency sub-carrier and symbol time tiles from one or more other subscriber devices, and wherein the additional sets of pilot symbols occupy different locations in the first and second frequency sub-carrier and symbol time tiles than those occupied by the first and second sets of pilot symbols.

16. The method of claim 15, further comprising:
updating channel estimates for the subscriber device based on the estimated phase offset across tones.

17. The method of claim 15, further comprising:
updating channel estimates for the subscriber device based on the estimated phase offset across tones and the estimated phase offset across OFDM symbols.

18. The method of claim 17, further comprising:
decoding data received from the subscriber device based on the updated channel estimates.

19. The method of claim 17, further comprising:
determining the updated channel estimates based on averaging the first set of pilot symbols together after removing from each pilot symbol in the first set of pilot symbols a known value of the pilot symbol as transmitted.

\* \* \* \* \*

UNITED STATES PATENT AND TRADEMARK OFFICE
CERTIFICATE OF CORRECTION

| | | |
|---|---|---|
| PATENT NO. | : 8,867,570 B2 | Page 1 of 1 |
| APPLICATION NO. | : 11/823692 | |
| DATED | : October 21, 2014 | |
| INVENTOR(S) | : Mudulodu et al. | |

It is certified that error appears in the above-identified patent and that said Letters Patent is hereby corrected as shown below:

In the claims

Column 9, line 55, Claim 1 replace "division, multiplexing" with --division multiplexing--.

Column 10, line 21, Claim 8 replace "receiving, a" with --receiving a--.

Signed and Sealed this
Third Day of March, 2015

Michelle K. Lee
*Deputy Director of the United States Patent and Trademark Office*